United States Patent
Wadewitz

(12) 
(10) Patent No.: US 6,636,990 B1
(45) Date of Patent: Oct. 21, 2003

(54) ELECTRONIC DATA ACQUISITION METHOD AND DATA PROCESSING SYSTEM

(76) Inventor: Rolf Wadewitz, Ruhr-Möhne-Eck 9, D-59755 Arnsberg (DE)

( * ) Notice: Subject to any disclaimer, the term of this patent is extended or adjusted under 35 U.S.C. 154(b) by 0 days.

(21) Appl. No.: 09/485,794

(22) PCT Filed: Aug. 11, 1998

(86) PCT No.: PCT/EP98/05089

§ 371 (c)(1), (2), (4) Date: Feb. 14, 2000

(87) PCT Pub. No.: WO99/09476

PCT Pub. Date: Feb. 25, 1999

(30) Foreign Application Priority Data

Aug. 14, 1997 (DE) .......................... 197 35 278

(51) Int. Cl.$^7$ ............................................. G06F 11/00
(52) U.S. Cl. ............................ 714/48; 714/2; 345/780; 345/710; 345/705
(58) Field of Search ...................... 700/83; 714/20, 714/758, 813, 48, 46, 38, 47, 44, 49; 707/523, 504, 505; 709/318; 345/707, 708, 780, 789, 710, 705; 706/21

(56) References Cited

U.S. PATENT DOCUMENTS

| | | | |
|---|---|---|---|
| 4,135,662 A | * | 1/1979 | Dlugos .......................... 714/46 |
| 4,500,964 A | | 2/1985 | Nickle |
| 4,918,444 A | * | 4/1990 | Matsubayashi ............. 714/813 |
| 5,414,859 A | | 5/1995 | Staudacher et al. |
| 5,432,902 A | * | 7/1995 | Matsumoto ................... 345/812 |
| 5,438,675 A | * | 8/1995 | Fujioka ........................ 714/48 |
| 5,710,901 A | * | 1/1998 | Stodghill et al. .............. 714/57 |
| 5,734,422 A | * | 3/1998 | Maurer et al. ............... 348/180 |
| 5,737,617 A | * | 4/1998 | Bernth et al. ................... 704/1 |
| 5,761,689 A | * | 6/1998 | Rayson et al. .............. 715/533 |
| 5,778,402 A | * | 7/1998 | Gipson ........................ 715/530 |
| 5,940,847 A | * | 8/1999 | Fein et al. ................... 715/540 |
| 6,085,206 A | * | 7/2000 | Domini et al. .............. 715/533 |
| 6,115,544 A | * | 9/2000 | Mueller ........................ 714/48 |
| 6,345,370 B1 | * | 2/2002 | Kwon .......................... 714/44 |
| 6,401,217 B1 | * | 6/2002 | Clark et al. ................... 714/48 |

FOREIGN PATENT DOCUMENTS

| EP | 0 587 375 A2 | 3/1994 |
|---|---|---|
| JP | 63121423 | 11/1989 |
| JP | 63121424 | 11/1989 |

* cited by examiner

Primary Examiner—Robert Beausoliel
Assistant Examiner—Christopher S McCarthy
(74) Attorney, Agent, or Firm—Scully, Scott, Murphy & Presser

(57) ABSTRACT

In order to prevent that applications (6) of a computer system are working with erroneous data, the validity of all data inputs is checked before the data inputs are transferred to one or more applications (6), wherein erroneous or invalid data inputs are rejected or corrected. The checking of the data inputs is carried out by one or more preprocessors (7) integrated into the event process of the computer system. The data receiving method may be applied to single-tasking or console-oriented operating systems as well as to multi-tasking or window-oriented operation-systems.

6 Claims, 2 Drawing Sheets

ELECTRONIC DATA ACQUISITION METHOD AND DATA PROCESSING SYSTEM

BACKGROUND OF THE INVENTION

1. Field of the Invention

The invention refers to a method for electronically receiving data comprising the steps of receiving data inputs, checking the validity of said data inputs by a preprocessor, and transferring said data inputs to an application of the computer system. The present invention further relates to an apparatus for carrying out an electronic data processing method.

2. Discussion of the Prior Art

In electronic data processing (EDP) essentially data are processed, stored, retrieved and changed. There is especially one criterion important in all fields of EDP with this, namely the authenticity, the faultlessness or validity and reliability of the data. Even the most innovative EDP system is only able to deliver poor results if the data it is based on are erroneous or invalid.

To solve this problem various methods are used in known EDP systems to make a transfer without information loss and an authentic marking of the data possible. Such methods are realised for example at machine level, by protocols including checksum calculation, by redundant codes with the possibility of error recognition and removal or by machine readable documents, such as scanable documents, barcodes, optical character recognition (OCR), and so forth. With a manual data input item numbers could for example be provided with check digits, to recognize and reject an invalid input. All those methods have the object to optimize the consistency and faultlessness of data during their transfer from A to B and to minimize or to prevent a loss of information during this transfer.

One main source, however, for erroneous data in EDP systems is in the field of data receiving, i.e. when data are generated in an EDP readable format for the first time, wherein mistakes or failures mainly appear at the manual data input, where a user enters or inputs the data manually into a computer system, usually via a terminal. Due to possible invalid data inputs there exists a high probability for information errors, which moreover will be permanent in the system for the whole lifetime of the data. Defective or faulty data may be for example wrong written names and addresses, wrong item numbers and price declarations, erroneous production quantities or measuring values and many more like this. In critical cases there may be for example a wrong diagnosis at the doctor, a too high dose of medicine, a wrong spare part at the garage or a too high reactor temperature in chemical processes.

The exemplary above mentioned mis-entrys should be avoided or corrected already at the source, i.e. at the level of data entry, if possible. There are known various simple methods for applications to ensure the basic elements of data receiving. These are for example text filters or numeric filters, logical tests of the inputs, checking the lengths of the inputs and the like. Thus it may be prevented that e.g. a user can enter a first name in a field intended for telephone numbers or enter the 32nd day of a month in a field intended for date. Such methods for checking the input of data, however; are often not used in the corresponding applications.

SUMMARY OF THE INVENTION

In view of the above mentioned state of the art it is an object of the present invention to provide a data receiving method and an EDP system ensuring that the application(s) of the system do(es) not work with erroneous or invalid data inputs, and this especially even if the application(s) of the system are not equipped with their own input examination.

According to the present invention, before the data inputs are transferred to one or more applications of the computer system, their validity is checked and invalid data inputs are rejected or corrected so that the application(s) can work with error-free or valid data even if the application(s) itself (themselves) does (do) not comprise its (their) own entry examination of data inputs. The checking of the data inputs is carried out by one or more preprocessors being integrated into the event process.

Another advantage of the invention is the fact that the data receiving method and the EDP system, respectively, may be applied to single-tasking or console-oriented operation systems, such as DOS, as well as to multi-tasking or window-oriented operation systems, such as Windows. Depending on the kind of the operation system the checking of the data inputs is integrated bind into the event process of the computer system at different places.

According to a further aspect of the present invention, before the actual usage or the purpose of the preprocessor or the data receiving method, respectively, all relevant data inputs are automatically and/or manually analysed by the preprocessor. Based on this analysis, the preprocessor generates an analysis- and action-profile, with which the checking and processing of the data inputs are performed.

Preferably, for each user of an application there may be generated an own analysis- and action-profile.

Further, with the support of the preprocessor the applications could be extended with functions desired by the user, which then may be used as a component of the application.

BRIEF DESCRIPTION OF THE DRAWINGS

The invention is herein explained in more detail with reference to preferred embodiments and with reference to the accompanying drawings, in which.

DETAILED DESCRIPTION OF PREFERRED EMBODIMENTS

Generally, there exists two kinds of computer designs and operating systems, i.e. console-oriented and window-oriented operation systems. The console-oriented systems are often only single-tasking systems, whereas the window-oriented systems are usually multi-tasking operating systems. In the following, substituting all possible computer operating systems, there are described a console-oriented single-tasking operating system, such as DOS, with reference to FIG. 1 and one window-oriented multi-tasking operating system, such as Windows, with reference to FIG. 2. Therewith, it should be generally shown where the user carries out an input and where the corresponding application receives this input for further processing. For a person skilled in the art of computer technology it should be easy to implement the invention in a corresponding way in all possible computer systems.

Data inputs 1 by a user, in the following generally referred to as events, e.g. may be the pressing of a button, the movement of the mouse, the input via special input media, such as barcode reader, touchscreen, digitizer, data glove and the like, or also through inputs generated by other machines or computer systems, such as internal messages of the operating system, signals on bus systems and networks, signals from serial interfaces, signals from malfunction wires of CNC working machines and the like.

Figure 1:
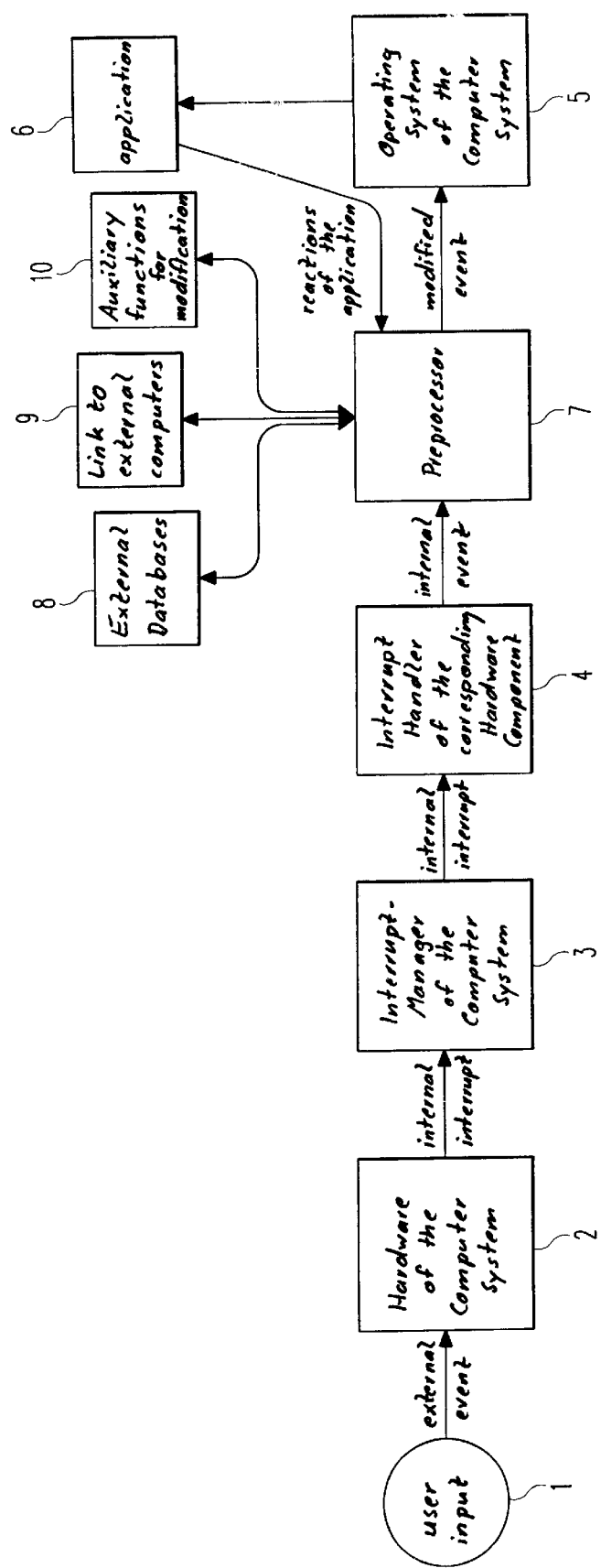
FIG. 1 is a simplified diagram of the event process in a single-tasking operation system.

First, FIG. 1 shows in a simplified diagram the event process in an EDP system with a single-tasking operating system, such as DOS. The external event, i.e. the input 1 of the user, generates an internal interrupt in the computer system through the hardware 2 of the computer system, which internal interrupt is administered and transferred by the interrupt manager 3 of the computer system. Finally, the internal interrupt is transformed into an internal event, i.e. in electronic signals, by an interrupt handler 4 which corresponds to the hardware component 2 of the user input 1. With the computer systems known so far, this internal event is supplied to the operating system 5 of the computer system and is supplied from this to the corresponding application 6, where it will be processed.

In the system according to the present invention, a preprocessor 7 is integrated before the operating system 5. This preprocessor 7 should perform a pretreatment of all events appearing, before those are passed in a possibly changed form as modified events to the actual application 6. Depending on the example of use, the preprocessor 7 is also able to create new events, to control for example dialogue courses, to control dialogues with the user, such as a password-input to enable access. It may also suppress and reject events. The preprocessor 7 may be additionally connected to external databases 8, external computer systems 9 and/or auxiliary functions 10.

With the single-tasking system of FIG. 1, usually only one application 6 can be opened or working at a time, whereof the application 6 processes all events or all events modified by the preprocessor 7, respectively, directly.

Figure 2:
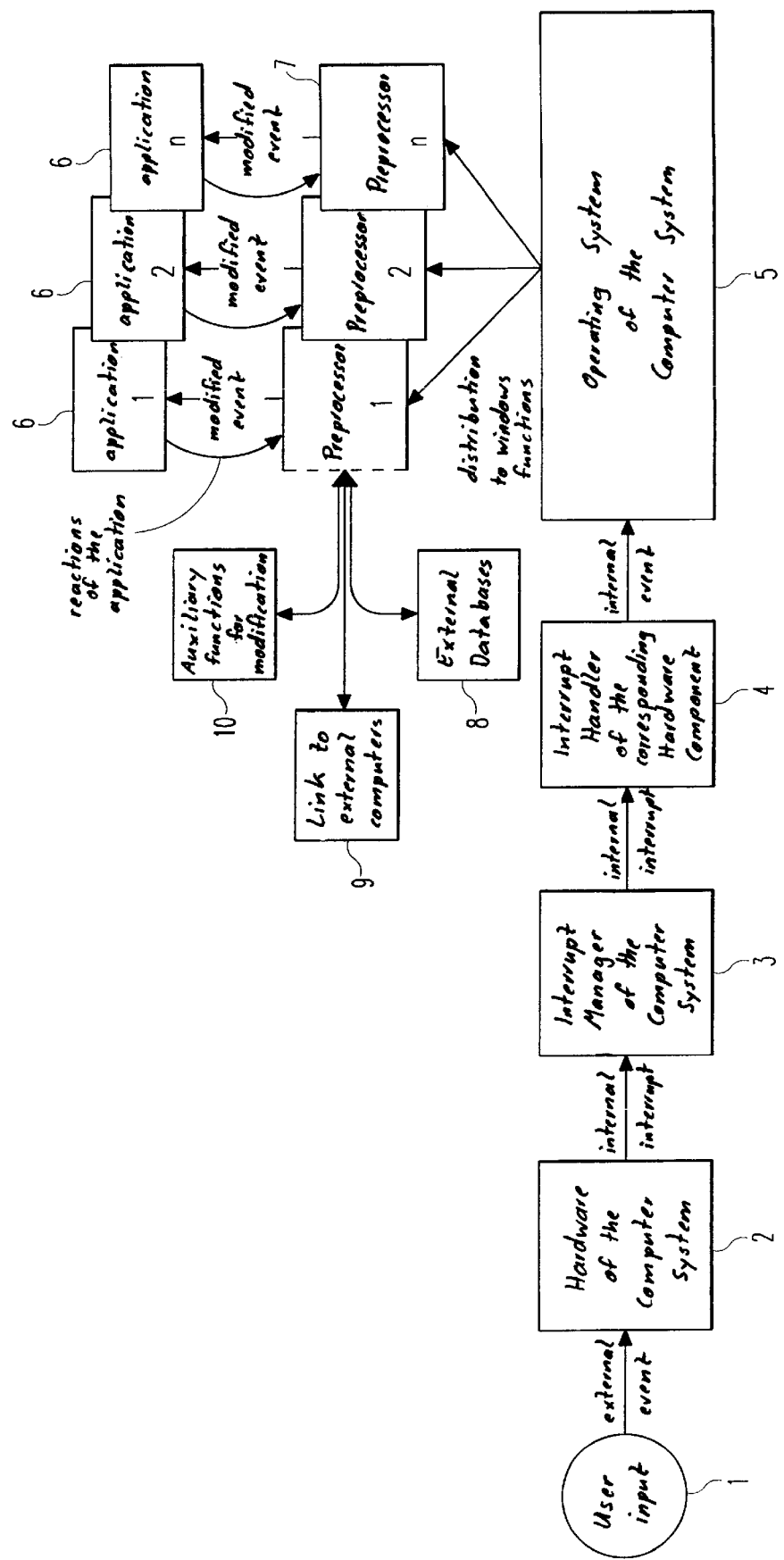
FIG. 2 is a simplified diagram of the event process in a multi-tasking operation system.

In FIG. 2 there is shown in a simplified manner the event process in an EDP system with a multi-tasking operating system 5, such as Windows. In such multi-tasking systems, a plurality of applications 6 may be opened or working (pseudo-) simultaneously. An external event is creating here an internal interrupt as well, which is catched and processed by the operating system 5. In contrast to the above single-tasking system, the operating system 5 here behaves like a distributor, which distributes the internal events each to the corresponding application(s) 6 and activates them. For that purpose, messages are sent from the operating system 5 to the windows of the single applications 6, and their window functions are called. The applications 6 experience a so-called passive program control.

In case of a multi-tasking system of FIG. 2, for each application 6 one preprocessor or part-preprocessor 7 is connected after the operating system. The preprocessors 7 are processing only certain events, which are alloted to the corresponding application 6 by the operating system 5.

For working with the preprocessor 7 on different systems as desired, there are several preparation steps necessary, which are described in the following in more detail. The single steps are:

I) connection phase
II) event-reaction-analysis phase
III) representation-analysis phase
IV) actions-profile phase
V) utilisation phase
VI) functionality supplement.

In the connection phase, first of all the preprocessor 7 has to be physically integrated into the existing computer system. For this, in all operating systems 5 an event driver preferably being part of the preprocessor 7 is integrated at a suitable place between the source of event and the further processing by the application(s) 6. This event driver has to offer the best possible physical integration of the preprocessor 7 into the event stream, depending on the kind of the operating system 5. For single-tasking systems for example a so-called TSR (terminate stay resident) driver is suitable, which is able to catch the hardware interrupts directly. In multi-tasking systems for example, the preprocessor 7 can process all events before they enter the corresponding window-function, via the so-called subclassing of window-functions.

When the physical integration of the preprocessor 7 by the event driver is finished, all events may be analysed, filtered and possibly modified before they are processed by the application(s) 6. In principle, only the function of the event driver has to be adapted to the corresponding operating system 5; all following analysis- and synthesis-functions of the preprocessor 7 relate exclusively to the abstract representation of events.

In the second step, the event-reaction-analysis phase, the preprocessor 7 analyses automatically and/or manually the event-reaction interfaces of the corresponding application(s) 6. Such event-reaction interfaces could be for example: focus and positions of input fields in the user screen interface; reactions to special system events, such as saving, printing, exit and the like; different meanings of events under different system conditions, such as input in idle-mode or input during a proceeding file search; or selection of different working modes of the application, such as mask-input, searching, editing of existing files, calculation, debit entry, credit entry and the like.

The above event-reaction-analysis may be carried out either once before the actual usage of the inventive method or as a continuous process during the operation of the application(s) 6 in the background.

In the event-reaction-analysis, information is continously gained and verified such that the preprocessor 7 receives an event, transfers this unmodified and after that rates the reaction of the application(s) 6 to this event. Such reactions are for example the display of a character by pressing the corresponding key of the keyboard or the trigger of the storing at the command "save". In the case of multi-tasking systems all relevant information could be redirected from the application to the preprocessor through the above mentioned subclassing, because internally the operating system is working with messages of the same, which are relatively easy to be rated by the preprocessor. In single-tasking systems the event-reaction analysis is more difficult, but even in this case a certain conclusion to the reactions of the application(s) can be gained by catching of all possible following events, such as cursor positions or the rating of the screen display or the hard disc accesses. To make the event-reaction analysis as complete and clear as possible, it is advisable to process a nonrecurrent manual teach-in phase of the preprocessor 7, in which the user creates defined events and notifies the preprocessor of the events following as reaction to those events and their meanings.

After such an automatic and/or manual event-reaction analysis, all relevant relations between events and reactions of data fields and control elements of this application are known to the preprocessor.

In a third step, the representation-analysis phase, now the meaning of the events, the permissible or valid formats of the events as well as the relations between different data fields are examined.

This representation-analysis phase may be carried out in a running mode of the application(s) within a teach-in cycle, in which the preprocessor 7 supervises all data inputs into relevant data fields of the application and gains certain conclusions on the coherence between the data fields therefrom. Also in this phase, a manual support through the user is advisable, who describes the data formats and data relations desired from him and being allowed or valid for the available data fields to the preprocessor. In the event-reaction analysis preceding this phase, the preprocessor was imparted with the positions of the data fields, and with this information all data inputs to the data fields could be channelled and analysed. If possible, typical meanings are assigned to the data fields by the preprocessor; for example an input field receiving only digits is a numerical field, an input field receiving only first names is a first-name field, an input field receiving only specially formatted digits is a date field, and so on.

If the above analysis phases, i.e. the event-reaction analysis and the representation analysis, have been performed successfully, thereafter, in a fourth step, the action-profile phase, it is determined with which action-profile the preprocessor 7 should react to certain valid and invalid events or relations.

The preprocessor 7 should for example automatically reject or correct invalid input values, change the representation of a date value (e.g. from "1.1.97" into "01.01.1997"), change and filter data values, restructure one or more data values or output error messages on invalid actions or inputs. Further, the preprocessor 7 may also adjust data inputs with external databases 8, so that for example at the input of a city and a corresponding zip-code the correctness of the zip-code could be checked with reference to the external zip-code database and, at a failure, the entered zip-code could be rejected or appropriately corrected and/or complemented, whereby the possibility of generating new events is demonstrated. Moreover, there is the possibility of additional security checks at critical actions, additional testing of access authorizations, such as passwords and the like.

In some cases it is possible to determine fundamental action-profiles already during the event-reaction-analysis phase and the representation-analysis phase. Further, there is the possibility to incorporate further user-specific action-profiles and to coordinate actions between several simultaneousely working applications, so that, for example, at the set up of a new customer in a mailing application, the parallel working customer-application is polled whether the customer is already stored in the database, and in the case of a negative inquiry the set up of the new customer is enabled in the mailing application.

Besides, the application profiles of the preprocessor 7 may be stored as a user-action-profile each for a certain user and reloaded on demand. Thus, each user of a computer system is able to create and own his or her personal action-profile.

After the course of the above described preparing phases the applications 6 of the computer system are usable for the user as usual. By means of the adjusted preprocessor 7 invalid data receiving is prevented, wrong data inputs are in some cases corrected and complemented via an adjustment with external applications or databases with the help of the determined analysis- and action-profile. Even with applications, which have no own examination of data inputs for invalid data inputs, the processing of erroneous data may be prevented reliably.

In the actual utilization phase, all events could be further analysed on demand and the analysis- and action-profiles could be extended, changed and verified continuously.

In case the normal utilization of the present application(s) 6 is not sufficient for the user and the user likes to have a supplementation to the functions of the application(s), this is also possible within the scope of a special programming of the preprocessor 7. By this way it is possible for the user to continue working with the familiar application and to incorporate additional functions into this application, which he has missed up to now.

For example, functions of the application may be extracted, processed with the preprocessor and provided again in a modified form to the application. One can imagine, for example, that in the case of a badly arranged input mask of the application the preprocessor could create a new window with data fields, in which window the whole functionality of an input mask required by the user is programmable. After changes to the mask, the virtual data fields are transferred into the corresponding data fields of the application, then the user does not work with the original input mask any longer, but with the input mask modified by himself or herself.

Further, the preprocessor is able to create so-called intelligent input fields by supervising the input fields during the data entering and, in case of wrong entries in a data field, copying the data automatically into the correct input field.

In the same way the applications could be extended with absent functions, such as a statistical evaluation. For this, the preprocessor arranges a new event, such as "show statistics", wherewith a new window may be opened, in which the user has programmed the desired new functionality before, i.e. for example the display of statistical values. Here, the preprocessor is communicating with the application in the background and is providing the desired data. For the user this new function becomes a part of the application, so to speak.

For these functions, the preprocessor could access to further external applications, such as for example a spreadsheet, graphic-software, statistical programs, and so forth, and operates as a linker, control element or manager between the active application and the possible external applications.

Another capability of the preprocessor exists in the generation of online functions. In this way the preprocessor may distribute events to a plurality of applications, so that the preprocessor creates and administers connections, the so-called links, between certain data fields. For example, an input field in US$ having a link to a financial program could perform the conversion from US$ to DEM using the actual stock quotation. These links may also exist via internal and external networks, to connect single applications to a larger computer network. There, parts of the functions of the application could be imported by the preprocessor and/or by the second application connected via an external link, wherein the necessary program flow may be programmed in the preprocessor by the user through a simple programming language.

By means of the free programmability and configurability of the preprocessor existing applications may be changed nearly arbitrarily and adapted to the requirements of the respective user, in a simple manner.

Out of a pool of different applications, the user could combine his optimal constellation.

All details shown in the figures and explained in the description are important for the invention. This is the same for the abstract, which also could considered for the interpretation of the scope of protection.

What is claimed is:

1. An electronic data receiving method, comprising the steps of
   (a) receiving data inputs,
   (b) checking the validity of said data inputs by a preprocessor including examining and analyzing a plurality of said data inputs to identify the meaning of and relations between data fields of said data inputs to develop analysis and action profiles which are used to check the validity of new data inputs in an on-going self learning process; and
   (c) rejecting or processing and correcting, respectively, said data inputs by said preprocessor in the case said data inputs are erroneous or invalid, and transferring said data inputs to an application of a computer system in the case said data inputs are valid or have been corrected;
   wherein, in the case of a single-tasking operating system, the step of checking and processing of said data inputs is carried out before their transfer to an operating system in the single-tasking operating system.

2. The method as claimed in claim 1, wherein before the usage of said preprocessor or the data receiving method, respectively, said data inputs are automatically and/or manually analysed with support of the user.

3. The method as claimed in claim 2, wherein said analysis of said data inputs is carried out in two steps, wherein in the first step the reactions of said application(s) to data inputs and in the second step the meaning of and the relations between data fields are analysed, and an analysis and actions profile is generated out of the analysis of the reactions to data inputs, by means of which the checking and processing of said data inputs is carried out.

4. The method as claimed in claim 3, wherein for each user there is generated a user-specific analysis and actions profile.

5. The method as claimed in claim 1, wherein first, as an initialisation of the usage, the preprocessor is physically integrated into the computer system in a connection phase, in an event-reaction-analysis phase analyses the event-reaction interfaces of said application, in a presentation-analysis phase examines the events and data fields and runs through an action-profile phase for determination of the reactions to valid and invalid events or relations as well as for determination of the special structures of relations of the previously determined elements, and
   wherein afterwards the preprocessor in a usage phase analyses events, extends, changes and verifies action- and analysis-profiles are extended, and permits a functionality-supplementation.

6. The method as claimed in claim 1, wherein said applications are extended with new functions, which are may be used as a virtual part of the applications.

* * * * *